US011651001B2

(12) United States Patent
Kao et al.

(10) Patent No.: US 11,651,001 B2
(45) Date of Patent: May 16, 2023

(54) UNIFYING TERMS OF INTEREST FROM A DATASET OF ELECTRONIC DOCUMENTS

(71) Applicant: THE BOEING COMPANY, Chicago, IL (US)

(72) Inventors: Anne Kao, Bellevue, WA (US); Nobal B. Niraula, Memphis, TN (US); Daniel I. Whyatt, Huntsville, AL (US)

(73) Assignee: THE BOEING COMPANY, Arlington, VA (US)

( * ) Notice: Subject to any disclaimer, the term of this patent is extended or adjusted under 35 U.S.C. 154(b) by 1082 days.

(21) Appl. No.: 15/921,045

(22) Filed: Mar. 14, 2018

(65) Prior Publication Data

US 2019/0286734 A1    Sep. 19, 2019

(51) Int. Cl.
| | |
|---|---|
| *G06F 17/30* | (2006.01) |
| *G06N 99/00* | (2019.01) |
| *G06F 16/2458* | (2019.01) |
| *G06N 20/00* | (2019.01) |
| *G06F 16/93* | (2019.01) |
| *G06F 16/22* | (2019.01) |

(52) U.S. Cl.
CPC ...... *G06F 16/2465* (2019.01); *G06F 16/2237* (2019.01); *G06F 16/93* (2019.01); *G06N 20/00* (2019.01); *G06F 2216/03* (2013.01)

(58) Field of Classification Search
CPC .... G06F 16/2237; G06F 16/951; G06F 40/30; G06F 16/2465
See application file for complete search history.

(56) References Cited

U.S. PATENT DOCUMENTS

| | | | |
|---|---|---|---|
| 6,003,808 A | 12/1999 | Nguyen et al. | |
| 7,540,430 B2 | 6/2009 | Jones et al. | |
| 7,831,597 B2 | 11/2010 | Wu et al. | |
| 8,234,279 B2 | 7/2012 | Wu et al. | |
| 10,089,581 B2 * | 10/2018 | Flores | G06F 16/285 |

(Continued)

OTHER PUBLICATIONS

Mikolov et al., "Distributed representations of words and phrases and their compositionality", Advances in neural Information processing systems, 2013, pp. 1-9.

*Primary Examiner* — Usmaan Saeed
*Assistant Examiner* — Earl Levi Elias
(74) *Attorney, Agent, or Firm* — Alleman Hall Creasman & Tuttle LLP

(57) ABSTRACT

A method is provided for analyzing and interpreting a dataset composed of electronic documents including freeform text. The method includes unifying terms of interest in the collection of terms of interest to identify variants of the terms of interest. This includes identifying candidate variants of a term of interest based on semantic similarity between the term of interest and other terms in the database, determined using an unsupervised machine learning algorithm. Linguistic features and contextual features of the term of interest and its candidate variants are extracted, at least the contextual features being extracted using the unsupervised machine learning algorithm. And a supervised machine learning algorithm is used with the linguistic features and contextual features to identify variants of the term of interest from the candidate variants, such as for application to generate features of the documents for data analytics performed thereon.

29 Claims, 5 Drawing Sheets

(56) References Cited

U.S. PATENT DOCUMENTS

| | | | |
|---|---|---|---|
| 2005/0033568 A1* | 2/2005 | Yu ........................ | G06F 40/247 |
| | | | 704/10 |
| 2008/0126080 A1 | 5/2008 | Saldanha et al. | |
| 2015/0134324 A1* | 5/2015 | Doornenbal .......... | G06F 40/169 |
| | | | 704/9 |
| 2017/0004413 A1* | 1/2017 | Flores ................. | G06F 16/2365 |
| 2017/0076221 A1* | 3/2017 | Boinodiris ............. | G06N 5/022 |
| 2019/0163768 A1* | 5/2019 | Gulati ..................... | G06F 16/56 |

* cited by examiner

| CANONICAL | ? | ? | ? | ? | |
|---|---|---|---|---|---|
| PART 1 | WATER | SEPARATOR | DRAIN | LINE | ☑ |
| PART 2 | SEPERATOR | WATER | DRAIN | LIN | ☑ |
| PART 3 | FUEL | SHUTOFF | VALVE | ACTUATOR | ☑ |
| PART 4 | | SEPARATOR | DRAIN | LINE | ☒ |

NUMBER OF WORDS

FIG. 2A

| | | | | HEAD |  |
|---|---|---|---|---|---|
| CANONICAL | ? | ? | ? | LINE | |
| PART 1 | WATER | SEPARATOR | DRAIN | LINE | ☑ |
| PART 2 | SEPERATOR | WATER | DRAIN | LIN | ☑ |
| PART 3 | FUEL | SHUTOFF | VALVE | ACTUATOR | ☒ |

FIG. 2B

| CANONICAL | WATER | ? | ? | LINE |
| --- | --- | --- | --- | --- |
| PART 1 | ❶ WATER | SEPARATOR | DRAIN | LINE |
| PART 2 | SEPERATOR | ❶ WATER | DRAIN | LIN |

FIG. 2C

| CANONICAL | WATER | SEPARATOR | ? | LINE |
| --- | --- | --- | --- | --- |
| PART 1 | WATER | ❷ SEPARATOR | DRAIN | LINE |
| PART 2 | ❷ SEPERATOR | WATER | DRAIN | LIN |

FIG. 2D

| CANONICAL | WATER | SEPARATOR | DRAIN | LINE |
| --- | --- | --- | --- | --- |
| PART 1 | WATER | SEPARATOR | ❸ DRAIN | LINE |
| PART 2 | SEPERATOR | WATER | ❸ DRAIN | LIN |

FIG. 2E

UNIFYING TERMS OF INTEREST FROM A DATASET OF ELECTRONIC DOCUMENTS

CROSS-REFERENCE TO RELATED APPLICATION(S)

The present application is related to U.S. patent application Ser. No. 15/627,977, entitled: Text Mining a Dataset of Electronic Documents to Discover Terms of Interest, filed on Jun. 20, 2017, the content of which is incorporated herein by reference in its entirety.

TECHNOLOGICAL FIELD

The present disclosure relates generally to data mining and, in particular, to unifying terms of interest from a dataset of electronic documents.

BACKGROUND

Data mining broadly seeks to expose patterns and trends in data, and most data mining techniques are sophisticated methods for analyzing relationships among highly formatted data, such as numerical data or data with a relatively small fixed number of possible values. However, a vast amount of information consists of textually-expressed information, including many database fields, reports, memos, e-mail, web pages, product descriptions, social media, and external news articles of interest to managers, market analysts, and researchers.

Text mining is an extension of the general notion of data mining in the area of free or semi-structured text. In comparison to data mining, text data analysis (also referred to as "text mining" or simply "text analysis") refers to the analysis of text, and may involve such functions as text summarization, text visualization, document classification, document clustering, document summarization, and document cross-referencing. Thus, text data analysis may help a knowledge worker find relationships between individual unstructured or semi-structured text documents and semantic patterns across large collections of such documents.

Research in the area of text mining has its roots in information retrieval, which began around 1960, when researchers started to systematically explore methods to match user queries to documents in a database. However, recent advances in computer storage capacity and processing power, coupled with massive increases in the amount of text available on-line, have resulted in a new emphasis on applying techniques learned from information retrieval to a wider range of text mining problems. Generally speaking, text mining requires the ability to automatically assess and characterize the similarity between two or more sources of text.

In general, text mining depends on the twin concepts of "document" and "term." As used in this disclosure, a "document" refers to a body of free or semi-structured text. The text can include the entire content of a document in its general sense, such as a book, an article, a paper, a data record or the like, or a portion of a traditional document, such as an abstract, a paragraph, a sentence, or a phrase, for example, a title.

Ideally, a document describes a coherent topic. In addition, a document can encompass text generated from an image or other graphics, as well as text recovered from audio or video formats.

On the other hand, a document can be represented as collections of "terms," each of which can appear in multiple documents. In some cases, a term can consist of an individual word used in the text. However, a term can also include multiple words that are commonly used together, for example, the part name "landing gear." This type of term is at times referred to as a "multiword term."

Documents such as data records are created in many different applications, such as to provide product description, a record of observations, actions taken or the like. In many instances, the data records are populated by free-form text that is entered by an author in order to document a particular event or activity. In order to sort, interpret, process or otherwise perform data analytics over the data records, it is oftentimes desirable to perform data or text mining to identify particular terms or multiword terms, such as part names, within the data records, and from which particular information may then be identified. For example, it may be desirable to identify every data record that includes a particular part name so as to identify trends or issues or to otherwise discern the current status. Since data records are commonly populated with free-form text, it may be difficult to consistently identify particular part names within the data records. In this regard, different expressions may be utilized to represent the same concepts, such as in the case of synonymous terms for the same concept. Additionally, certain information, such as part names, within a data record may be abbreviated or misspelled or acronyms may be employed which further complicate efforts to consistently identify particular information within the data records.

By way of example, the airline industry relies upon data records entered by personnel in support of their engineering activities and engineering activities of industrial robots during pre-production, production and post-production of an aircraft or other manufactured product. In a more particular example, mechanics create data records relating to the results of inspections, repairs that have been undertaken and the like. The principal job of these mechanics is to maintain the aircraft in conformance with a schedule, such as a flight schedule or a maintenance schedule. These duties typically leave only limited time for documentation of the activities undertaken by the mechanics. As such, the mechanics may create data records in a relatively expedited fashion including, for example, the liberal use of abbreviations and acronyms, some of which are widely understood and some of which are developed ad hoc by the mechanics based upon, for example, the working conditions. As with the creation of any written record, the resulting data records may include spelling errors, erroneous spaces in words, omissions of spaces between words, or other typographical errors. Such misspellings and abbreviations may make it somewhat difficult to identify a particular word within a data record. By way of example, a computer may be referenced within a data record as a "computer," a "comptr," a "compter," a "computor" or a "computo." Complicating the situation, "comp" within a data record may reference a computer; however, it may, instead, reference a compressor, compartment, or a compensator.

The inconsistencies within data records as to the manner in which part names are referenced therefore makes any subsequent identification of part names within the data records a challenge. This challenge is exacerbated by the large number of different part names, such as several thousand part names in the airline industry, with some of the part names only varying slightly from other part names. The challenge may also lead to inaccurate or incomplete data on which engineering or other activities of personnel and industrial robots are performed on a manufactured product, or in some instances on which personnel or industrial robots fail to perform such activities. Within the airline industry, the terminology, including the part names, may vary from airline to airline, from model to model, from fleet to fleet, from supplier to supplier, and/or from location to location, thereby further increasing the complexity of any subsequent efforts to analyze the data records. Furthermore, the number of data records may also be substantial and, in some instances, may number in the hundreds of thousands, thereby requiring that any technique for analyzing the data records be quite efficient if it is to be practical.

Therefore it would be desirable to have a system and method that takes into account at least some of the issues discussed above, as well as other possible issues.

BRIEF SUMMARY

Example implementations of the present disclosure are directed to unifying terms of interest such as part names or other multiword terms from electronic documents, even in instances in which the electronic documents are populated with free-form text that may include various misspellings, acronyms, abbreviations or the like. Given the fact that a term of interest may have multiple variants in free-form text, mining information such as how often the term appears, how the item referred to by the term is trending, and which documents contain that item, may be deficient if only one variation of the term is considered. Example implementations of the present disclosure address the problem of finding variants of a term of interest (e.g., due to spelling errors or ad hoc abbreviations) and unifying these variants to improve the quality of information with reference to the term of interest which can be inferred from the electronic documents. This allows more accurate and reliable data analytics performed on the electronic documents.

The unification of terms of interest such as part names for manufactured products such as aircraft or other vehicles facilitates a number of data analytics such as to identify manufacturing and supplier quality issues, recognizing duplicated designs across different aircraft models, and generating performance trends, parts inventory and fix effectiveness, which support engineering and other activities performed by personnel and industrial robots on those manufactured products, aircraft or other vehicles. In short, it is often important if not essential to solve a wide variety of quality, safety, operational issues, as well as maintenance and reliability issues, and for managing supply chains and providing effective customer support. However, it is a challenging task as there is little consistency in how parts are actually described in free text, with variations spawned by misspellings, acronyms, abbreviations or the like. Typical parts lists are unable to provide reasonable coverage of parts names as they appear in free text due to variation in expression as described above. Some example implementations of the present disclosure approach this problem with a unique combination of domain knowledge, linguistic knowledge, machine learning and statistical inference to extract part names with minimal of any user input.

The present disclosure thus includes, without limitation, the following example implementations.

Some example implementations provide a method of extracting features from electronic documents for database query processing, the method comprising accessing, by processing circuitry, a memory storing a collection of terms of interest from a database composed of a plurality of electronic documents including free-form text; unifying, by the processing circuitry, terms of interest in the collection of terms of interest to identify variants of the terms of interest, including for a term of interest: using an unsupervised machine learning algorithm to determine semantic similarity between the term of interest and other terms in the database, and identify candidate variants of the term of interest based thereon; extracting linguistic features and contextual features of the term of interest and the candidate variants of the term of interest, at least the contextual features being extracted using the unsupervised machine learning algorithm; and using a supervised machine learning algorithm with the linguistic features and contextual features to identify variants of the term of interest from the candidate variants of the term of interest; and executing, by the processing circuitry, a database query for features of the plurality of electronic documents from the database using the collection of terms of interest with arrays in which the terms of interest and variants of the terms of interest are collected, for data analytics performed thereon.

In some example implementations of the method of any preceding example implementation, or any combination of any preceding example implementations, before unifying the terms of interest, the method further comprises defining a training set for the supervised machine learning algorithm, the training set including pairs of a term and respective other terms, and predictions of the respective other terms being variants of the term, the predictions including predictions of at least some of the other terms being variants of the term, and at least some of the other terms not being variants of the term; extracting linguistic features and contextual features of the term and the respective other terms, at least the contextual features being extracted using the unsupervised machine learning algorithm; and using the training set and the linguistic features and contextual features to train the supervised machine learning algorithm.

In some example implementations of the method of any preceding example implementation, or any combination of any preceding example implementations, after unifying the terms of interest, the method further comprises normalizing, by the processing circuitry, the terms of interest to provide canonical names for the terms of interest and variants of the terms of interest, the arrays in which the terms of interest and variants of the terms of interest are collected being identifiable by respective ones of the canonical names.

In some example implementations of the method of any preceding example implementation, or any combination of any preceding example implementations, the collection of terms of interest includes multiword terms.

In some example implementations of the method of any preceding example implementation, or any combination of any preceding example implementations, unifying the terms of interest includes unifying the multiword terms that are equal in number of words and according to head words in the multiword terms.

In some example implementations of the method of any preceding example implementation, or any combination of any preceding example implementations, unifying the multiword terms includes identifying a group of the multiword terms that are equal in number of words; and unifying head words in the group of the multiword terms, including for a head word of the head words, using the unsupervised machine learning algorithm and the supervised machine learning algorithm to identify others of the head words that are variants of the head word, those of the group of the multiword terms that have the head word and variants of the head word constituting a unified group of multiword terms.

In some example implementations of the method of any preceding example implementation, or any combination of any preceding example implementations, the method further comprises normalizing, by the processing circuitry, the head word and variants of the head word to provide a canonical name for the head word and variants of the head word, and in a display of multiword terms in the unified group of multiword terms, represent any of the head word and variants of the head word that differ from the canonical name with the canonical name.

In some example implementations of the method of any preceding example implementation, or any combination of any preceding example implementations, unifying the multiword terms further includes unifying modifiers in the unified group of multiword terms, including for a modifier of the modifiers in a multiword term of the unified group, using the unsupervised machine learning algorithm and the supervised machine learning algorithm to identify others of the modifiers in others of the unified group that are variants of the modifier.

In some example implementations of the method of any preceding example implementation, or any combination of any preceding example implementations, the method further comprises normalizing, by the processing circuitry, the modifier and variants of the modifier to provide a canonical name for the modifier and variants of the modifier, and in a display of multiword terms in the unified group of multiword terms, represent any of the modifier and variants of the modifier that differ from the canonical name with the canonical name.

Some example implementations provide an apparatus for extracting features from electronic documents for database query processing. The apparatus comprises a memory storing a collection of terms of interest from a database composed of a plurality of electronic documents including free-form text; and processing circuitry configured to access the memory, and execute computer-readable program code to cause the apparatus to at least perform the method of any preceding example implementation, or any combination of any preceding example implementations,.

Some example implementations provide a non-transitory computer-readable storage medium for extracting features from electronic documents for database query processing. The non-transitory computer-readable storage medium has computer-readable program code stored therein that in response to execution by processing circuitry, causes an apparatus to at least perform the method of any preceding or any subsequent example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 2A, 2B, 2C, 2D and 2E illustrate an example of unifying and normalizing four multiword terms for four parts;

DETAILED DESCRIPTION

Figure 1:
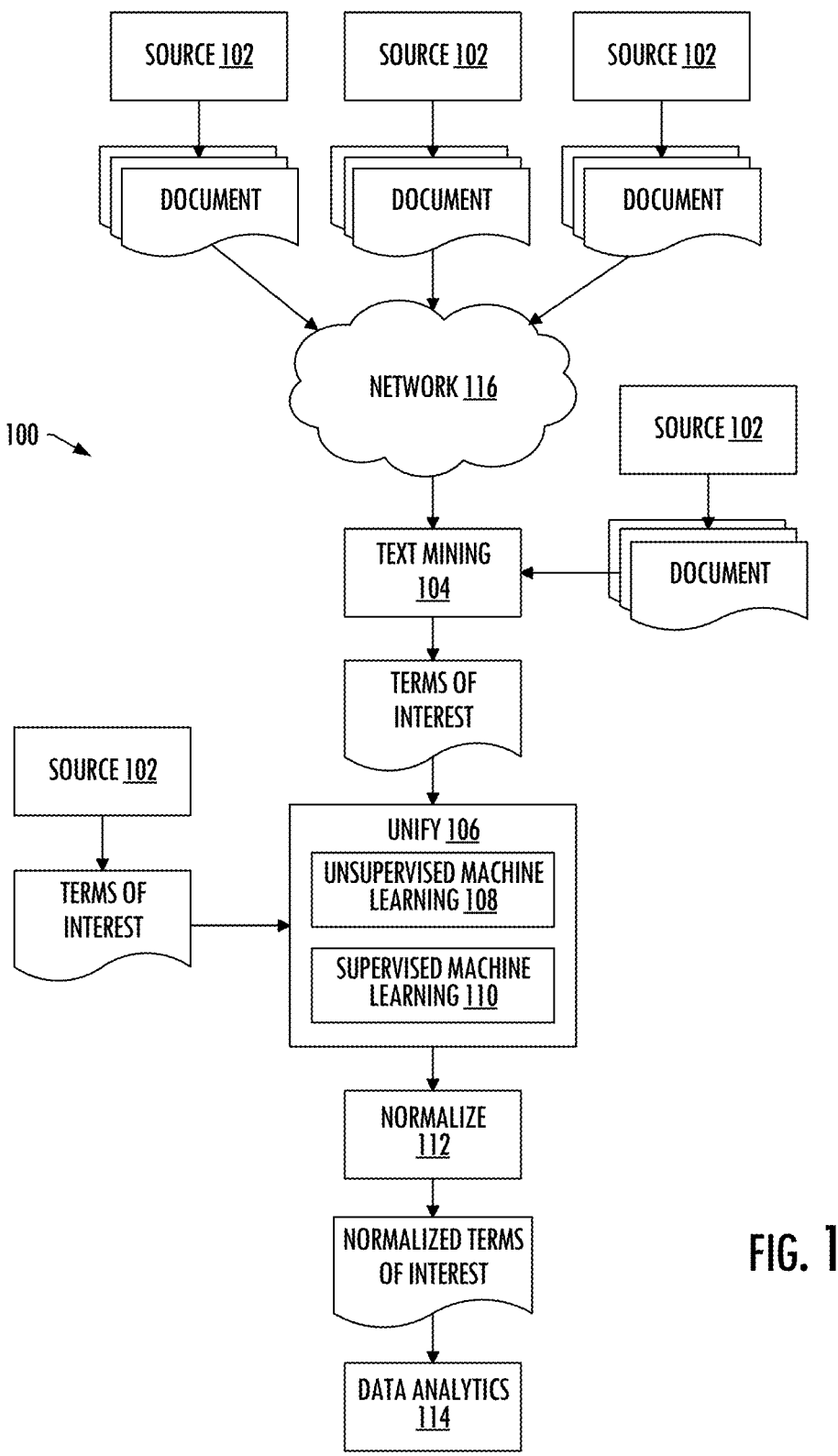
FIG. 1 illustrates a system for extracting features from electronic documents for database query processing, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to data mining, and more particularly directed to unifying terms of interest, such as part names of a machine such as an aircraft or other vehicle, from a dataset of electronic documents.

FIG. 1 illustrates a system 100 for extracting features from electronic documents for database query processing, according to example implementations of the present disclosure. The system may include any of a number of different subsystems (each an individual system) for performing one or more functions or operations. As shown, in some examples, the system includes one or more of each of a source 102 of one or more electronic documents, a text mining module 104, a unifying module 106 that implements an unsupervised machine learning algorithm 108 and a supervised machine learning algorithm 110, a normalizing module 112, and a data analytics module 114. The subsystems may be co-located or directly coupled to one another, or in some examples, various ones of the subsystems may communicate with one another across one or more computer networks 116. Further, although shown as part of the system, it should be understood that any one or more of the source, text mining module, unifying module, unsupervised machine learning algorithm, supervised machine learning algorithm, normalizing module or data analytics module may function or operate as a separate system without regard to any of the other subsystems. It should also be understood that the system may include one or more additional or alternative subsystems than those shown in FIG. 1.

As described herein, a source 102 is a source of one or more of a plurality of electronic documents including free-form text. In some examples, the source includes a memory storing a database composed of the plurality of electronic documents including free-form text. This memory may be located at a single source or distributed across multiple sources. The text mining module 104 is configured to access the memory and text mine the plurality of electronic documents including free-form text for a collection of terms of interest, such as according to a process described in the above-cited and incorporated '977 application. In some examples, the text mining module includes a memory storing the collection of terms of interest. Additionally or alternatively, in some examples, a source may be a source of the collection of terms of interest, and include a memory storing the collection.

An electronic document is a document in electronic form, and as described above, a document refers to a body of free or semi-structured text, which can include the entire content of a document in its general sense, such as a book, an article, a paper, a data record or the like, or a portion of a traditional document, such as an abstract, a paragraph, a sentence, or a phrase, for example, a title. Ideally, a document describes a coherent topic. In addition, a document can encompass text generated from an image or other graphics, as well as text recovered from audio or video formats.

A document can be represented as collections of terms, each of which can appear in multiple documents. A term can consist of an individual word used in the text, or a term can include multiple words that are commonly used together (i.e., a multiword term). In some examples, the plurality of electronic documents includes electronic documents (e.g., data records) that describe maintenance activities for a machine such as an aircraft or other vehicle. And in at least some of these examples, terms of interest include names of the machine parts of which the machine is composed.

According to example implementations, the unifying module 106 is configured to unify terms of interest in the collection of terms of interest to identify variants of the terms of interest using the unsupervised machine learning algorithm 108 and the supervised machine learning algorithm 110. The data analytics module 114 is configured to execute a database query for features of the plurality of electronic documents from the database using the collection of terms of interest with arrays in which the terms of interest and variants of the terms of interest are collected, for data analytics performed thereon. In some examples, this includes the data analytics module being configured to search the plurality of electronic documents for one or more electronic documents that reference or are considered to reference a particular term of interest or any of its variants from the collection of terms of interest with arrays in which the terms of interest and variants of the terms of interest are collected.

More particularly, for a term of interest, the unifying module 106 is in some examples configured to use the unsupervised machine learning algorithm 108 to determine semantic similarity between the term of interest and other terms in the database, and identify candidate variants of the term of interest based thereon. Suitable examples of unsupervised machine learning algorithms include neural language models such as Word2vec, although other unsupervised machine learning algorithms are also suitable. An example of candidate variants of the term "cylinder" may include "bottle," "cyclinder," "cilinder," "cylinde" and "clinder."

The unifying module 106 is configured to extract linguistic features and contextual features of the term of interest and the candidate variants of the term of interest. Linguistic features may include features in a number of different subfields of linguistics, including, for example, syntax, lexicon, semantics and the like. More specific examples of linguistic features include string similarities such as edit distance. Contextual features are features related to linguistic context (including, for example, semantic similarity), and according to some examples, at least these are extracted using the unsupervised machine learning algorithm. The unifying module is configured to use the supervised machine learning algorithm 110 with the linguistic features and contextual features to identify variants of the term of interest from the candidate variants of the term of interest. One suitable example of a supervised machine learning algorithm is logistic regression, although other supervised machine learning algorithms are also suitable. In the above example of the term "cylinder," the variants may include "cyclinder," "cilinder," "cylinde" and "clinder" (excluding "bottle" from the candidate variants). In some examples, the terms of interest and variants of the terms of interest are collected in arrays (e.g., variant (cylinder)={cylinder, cyclinder, cilinder, cylinder, clinder}), and may be stored with or separate from the collection of terms of interest.

Before the terms of interest are unified, the unifying module 106 in some examples is configured to train the supervised machine learning algorithm 110. In these examples, the unifying module is configured to define a training set for the supervised machine learning algorithm. The training set includes pairs of a term and respective other terms, and predictions of the respective other terms being variants of the term. The predictions include predictions of at least some of the other terms being variants of the term, and at least some of the other terms not being variants of the term. An example of a training set for the term "door" may include the following:

(door, oor, YES)
(door, poor, NO)
(door, don, YES)
(door, man, NO)

Also as part of training the supervised machine learning algorithm 110 according to the above examples, the unifying module 106 is configured to extract linguistic features and contextual features of the term and the respective other terms, with at least the contextual features being extracted using the unsupervised machine learning algorithm 108. The unifying module is then configured to use the training set and the linguistic features and contextual features to train the supervised machine learning algorithm.

After the terms of interest are unified, in some examples, the normalizing module 112 is configured to normalize the terms of interest to provide canonical names for the terms of interest and variants of the terms of interest. In these examples, the arrays in which the terms of interest and variants of the terms of interest are collected are identifiable by respective ones of the canonical names. A term of interest and its variants may be normalized in a number of different manners. In some examples, they may be normalized to provide a canonical name that is the one of the term and its variants that is most frequently found in the electronic documents (highest number of occurrences in the electronic documents), regardless of whether the canonical name is the standard spelling in any standard language.

In some examples, the collection of terms of interest includes multiword terms. In at least some of these examples, the unifying module 106 is configured to unify the multiword terms that are equal in number of words and according to head words in the multiword terms. In linguistics, the head word (or more simply head) of a multiword term is the word that determines the syntactic category of the multiword term.

In some examples including multiword terms in the collection of terms of interest, the unifying module 106 is configured to identify a group of the multiword terms that are equal in number of words, and unify head words in the group of the multiword terms. This includes for a head word of the head words, the unifying module being configured to use the unsupervised machine learning algorithm 108 and the supervised machine learning algorithm 110 to identify others of the head words that are variants of the head word. Those of the group of the multiword terms that have the head word and variants of the head word, then, may constitute a unified group of multiword terms.

Even further in some examples including multiword terms, the normalizing module 112 is configured to normalize the head word and variants of the head word to provide a canonical name for the head word and variants of the head word. In these further examples, any of the head word and variants of the head word that differ from the canonical name may be represented with the canonical name in a display of multiword terms in the unified group of multiword terms.

Similar to the head words in the group of multiword terms, the unifying module 106 in some examples is configured to unify modifiers in the unified group of multiword terms. This includes for a modifier of the modifiers in a multiword term of the unified group, the unifying module being configured to use the unsupervised machine learning algorithm 108 and the supervised machine learning algorithm 110 to identify others of the modifiers in others of the unified group that are variants of the modifier. And even further, in some examples, the normalizing module 112 is configured to normalize the modifier and variants of the modifier to provide a canonical name for the modifier and variants of the modifier. In these examples, any of the modifier and variants of the modifier that differ from the canonical name may be represented with the canonical name in a display of multiword terms in the unified group of multiword terms.

FIGS. 2A-2E illustrate an example of unifying and normalizing four multiword terms for four parts. FIGS. 2A and 2B illustrate respectively identification of a group of the multiword terms that are equal in number of words, and unify head words in the group of the multiword terms. Any one of the head words in the group may be taken as the head word with which the unsupervised machine learning algorithm 108 and the supervised machine learning algorithm 110 are used to identify others of the head words that are variants of the head word. Or in some examples, the one of the head words that is most frequently found in the electronic documents may be the head word for which variants are identified. As shown, this head word is "line," with "lin" being identified as a variant. In the group of parts equal in number of words, parts 1 and 2 have the head word and a variant of the head word, and may constitute a unified group of multiword terms. And as also shown, the head word and its variant may be normalized to provide a canonical name for the head word and variant, which similar to before, may be based on frequency in the electronic documents.

As shown in FIGS. 2C, 2D and 2E, each of the three modifiers in the unified group of multiword terms (parts 1 and 2) may be unified and normalized, such as in a manner the same as or similar to the head words.

Figure 3:
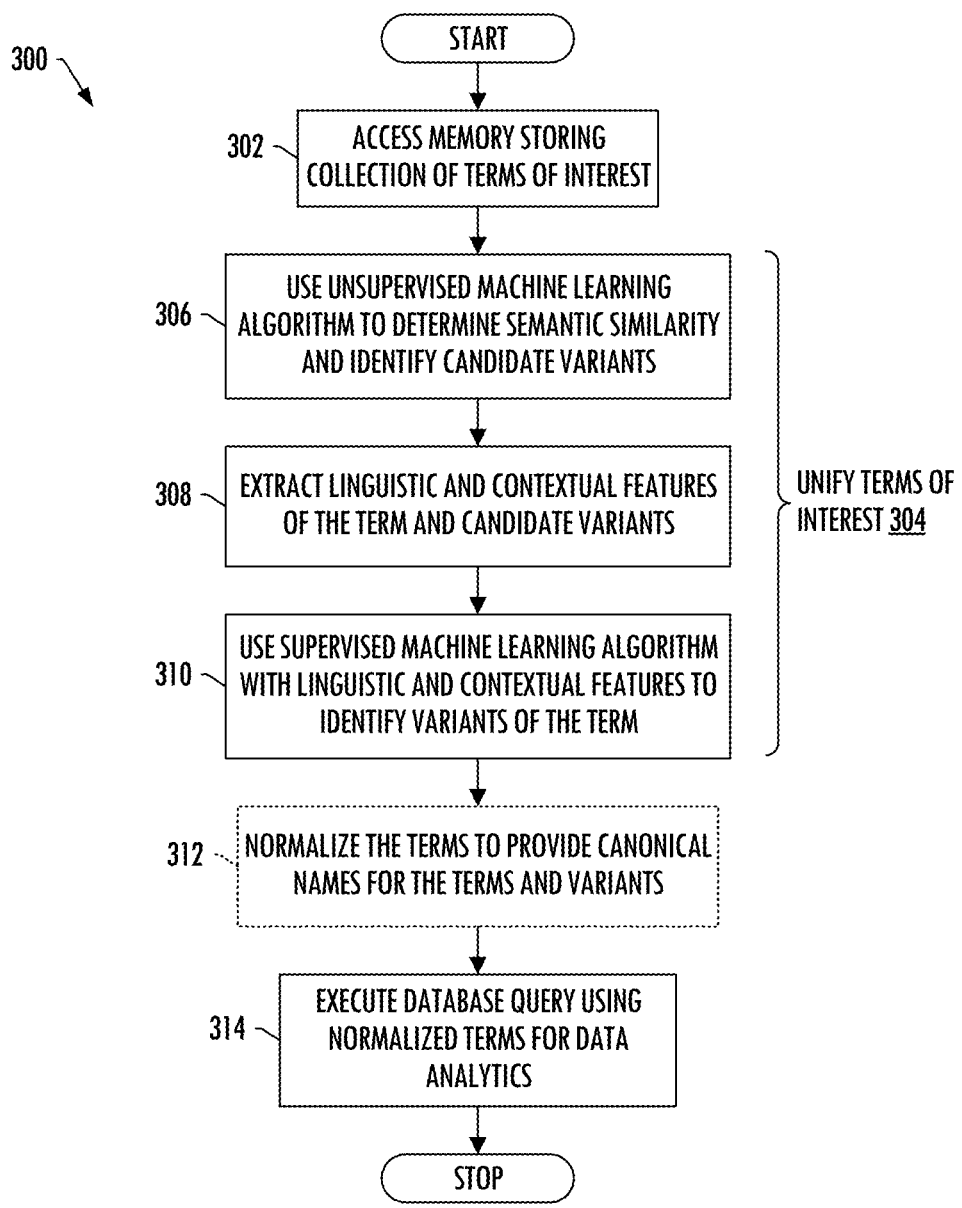
FIG. 3 is a flowchart illustrating various steps in a method of extracting features from electronic documents for database query processing, according to various example implementations.

FIG. 3 is a flowchart illustrating various steps in a method 300 of extracting features from electronic documents for database query processing, according to example implementations of the present disclosure. As shown at block 302, the method includes accessing, by processing circuitry, a memory storing a collection of terms of interest from a database composed of a plurality of electronic documents including free-form text. See, for example, FIG. 4, processing circuitry 402 and memory 404. As shown at 304, the method includes unifying, by the processing circuitry, terms of interest in the collection of terms of interest to identify variants of the terms of interest.

Unifying the terms of interest includes for a term of interest, using an unsupervised machine learning algorithm to determine semantic similarity between the term of interest and other terms in the database, and identify candidate variants of the term of interest based thereon, as shown at block 306. It also includes extracting linguistic features and contextual features of the term of interest and the candidate variants of the term of interest, with at least the contextual features being extracted using the unsupervised machine learning algorithm, as shown at block 308. And it includes using a supervised machine learning algorithm with the linguistic features and contextual features to identify variants of the term of interest from the candidate variants of the term of interest, as shown at block 310.

In some examples, after unifying the terms of interest, the method includes normalizing, by the processing circuitry, the terms of interest to provide canonical names for the terms of interest and variants of the terms of interest, as shown in block 312. The terms of interest and variants of the terms of interest may be collected in arrays, and these arrays may be identifiable by respective ones of the canonical names.

And as also shown, the method includes executing, by the processing circuitry, a database query for features of the plurality of electronic documents from the database using the collection of terms of interest with arrays in which the terms of interest and variants of the terms of interest are collected, for data analytics performed thereon, as shown in block 314. As described above, this may include searching the plurality of electronic documents to identify one or more electronic documents that reference or are considered to reference a particular term of interest or any of its variants from the collection of terms of interest with arrays in which the terms of interest and variants of the terms of interest are collected.

Sources of data records populated by free-form text such as maintenance records, logbook records and manufacturer communication system messages often contain critical information about aircraft parts, including data on emerging maintenance and safety issues, fix effectiveness, parts reliability, and on parts inventory. In the case of maintenance records that describe maintenance activities, it may be desirable to identify trends in part maintenance or safety. Example implementations of the present disclosure enable the identification of a large list of parts that are actually in the maintenance records, which can be used to identify issues with those parts. This would be a practically impossible task for one to perform manually as it would require searching for the list of parts but also variations in how those parts are expressed in the data.

More particularly, for example, the word "valve" was spelled in data as "val," "valv," "vlv," "valve," "vale," "vlve," "valva," "vlvl," etc. It is typically used in a multi-word term such as "air control flow valve," "air flow valve," "airflow valve," "control valve," "flow valve," "bleed valve," "engine bleed air isolation valve," etc. In turn, each of the words "bleed," "isolation," and "engine" has a variety of spellings in the data, which compounds the problem of identifying these parts in a dataset. To facilitate an analysis of the dataset in a number of contexts such as to identify emerging maintenance issues, safety issues, fix effectiveness, parts reliability or parts inventory, example implementations of the present disclosure collect variants of these terms to identify which ones refer to, say, "air flow control valve," which permits an accurate count for each of the parts involved in these issues and thereby a valuable analysis.

There are many advantages of example implementations of the present disclosure, both in the context of part names and in other contexts. For part names, once the part names are discovered and unified from a database of electronic documents including free-form text, a database query may be executed to search for electronic documents that reference a part name under variations in spelling, using the normalized or any other of spellings of the part name. Other applications are also possible, and any of a number of applications may be used to support engineering and other activities performed by personnel and industrial robots on manufactured products such as aircraft or other vehicles. In some applications, the discovered part names, together with information on the electronic documents in which they are referenced, can be stored in a database or document collection for use by additional tools or applications. A few example use cases are summarized below.

A supplier management worker can use the identified information to see whether multiple programs and regions are ordering the same parts. This allows for comparison of pricing on the same part, and opportunities for consolidation of purchasing under larger quantity and bigger discount. The appropriate products (e.g., aircraft) can then be manufactured or maintained using these less costly parts.

A reliability engineer can use the identified information, potentially from multiple operators (e.g., airlines), to see whether maintenance on a certain part has occurred more frequently than expected, or to verify whether the fix performed on the issue has been effective in the first attempt or second attempt. This information can then be used to in ongoing maintenance of the appropriate products (e.g., aircraft), if not also future manufacture of new products. And in some examples, one or more industrial robots can be programmed to perform maintenance work on the appropriate products using this information.

A manufacturing quality engineer can use the identified information, potentially covering multiple product lines, to see whether an area in manufacturing has more quality issues than expected and develop additional actions such as root cause analysis of the issue. This root cause analysis can then be used in manufacturing and maintenance activities for one or more of the relevant product lines. More particularly, in some examples, one or more industrial robots can be programmed to perform manufacturing or maintenance work on one or more of the relevant product lines using this root cause analysis or its results.

A safety analyst can use the identified information to see whether working on a particular part or utilizing a particular tool seems to cause unacceptable risk in workplace, and whether a new work guideline should be generated to reduce that risk. This may include how work is performed on the particular part, or the tool or how the tool is utilized to perform work on the part. More specifically, in some examples, it may include how an industrial robot is programmed to perform work on the particular part, selection of a tool used by the industrial robot to perform work on the part, or how the industrial robot is programmed to use the tool to perform work on the part.

According to example implementations of the present disclosure, the system 100 and its subsystems including the source 102, text mining module 104, unifying module 106, unsupervised machine learning algorithm 108, supervised machine learning algorithm 110, normalizing module 112 and data analytics module 114 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
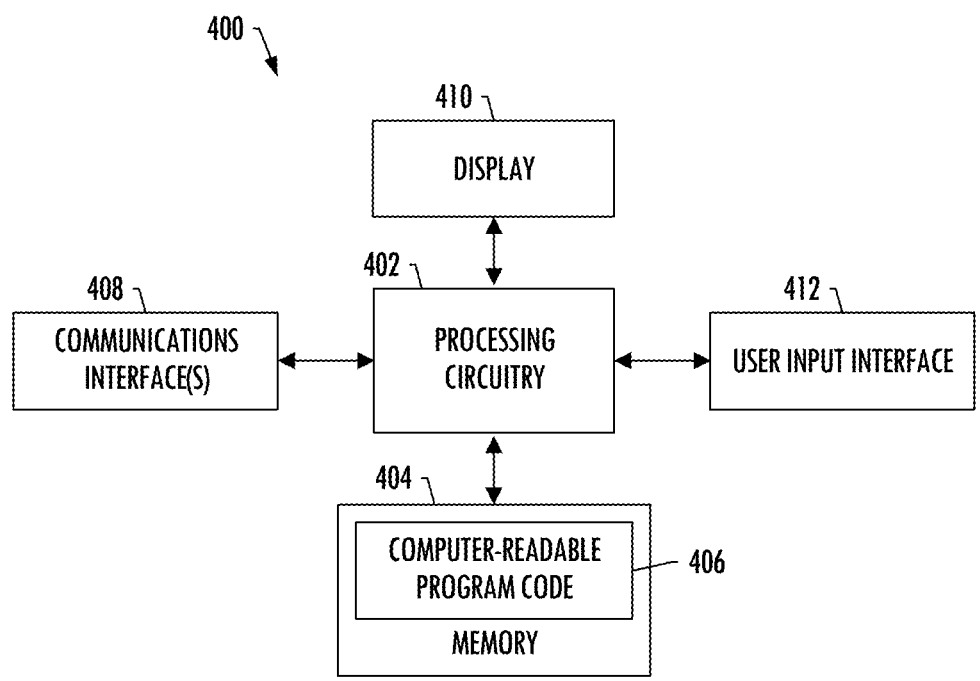
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for extracting features from electronic documents for database query processing, the apparatus comprising:
a memory storing a collection of terms of interest from a database composed of a plurality of electronic documents including free-form text; and processing circuitry configured to access the memory, and execute computer-readable program code to cause the apparatus to at least:
  unify terms of interest in the collection of terms of interest to identify variants of the terms of interest, including for a term of interest, the apparatus being caused to at least:
    use an unsupervised machine learning algorithm to determine semantic similarity between the term of interest and other terms in the database, and identify candidate variants of the term of interest based thereon;
    extract linguistic features and contextual features of the term of interest and the candidate variants of the term of interest, at least the contextual features being extracted using the unsupervised machine learning algorithm; and
    use a supervised machine learning algorithm with the linguistic features and contextual features to identify variants of the term of interest from the candidate variants of the term of interest; and
  execute a database query for features of the plurality of electronic documents from the database using the collection of terms of interest with arrays in which the terms of interest and variants of the terms of interest are collected, for data analytics performed thereon.

2. The apparatus of claim 1, wherein before the apparatus is caused to unify the terms of interest, the processing circuitry is configured to execute further computer-readable program code to cause the apparatus to further:
  define a training set for the supervised machine learning algorithm, the training set including pairs of a term and respective other terms, and predictions of the respective other terms being variants of the term, the predictions including predictions of at least some of the other terms being variants of the term, and at least some of the other terms not being variants of the term;
  extract linguistic features and contextual features of the term and the respective other terms, at least the contextual features being extracted using the unsupervised machine learning algorithm; and
  use the training set and the linguistic features and contextual features to train the supervised machine learning algorithm.

3. The apparatus of claim 1, wherein after the apparatus is caused to unify the terms of interest, the processing circuitry is configured to execute further computer-readable program code to cause the apparatus to further:
  normalize the terms of interest to provide canonical names for the terms of interest and variants of the terms of interest, the arrays in which the terms of interest and variants of the terms of interest are collected being identifiable by respective ones of the canonical names.

4. The apparatus of claim 1, wherein the collection of terms of interest includes multiword terms.

5. The apparatus of claim 4, wherein the apparatus being caused to unify the terms of interest includes being caused to unify the multiword terms that are equal in number of words and according to head words in the multiword terms.

6. The apparatus of claim 4, wherein the apparatus being caused to unify the multiword terms includes being caused to at least:
  identify a group of the multiword terms that are equal in number of words; and
  unify head words in the group of the multiword terms, including for a head word of the head words, using the unsupervised machine learning algorithm and the supervised machine learning algorithm to identify others of the head words that are variants of the head word, those of the group of the multiword terms that have the head word and variants of the head word constituting a unified group of multiword terms.

7. The apparatus of claim 6, the processing circuitry is configured to execute further computer-readable program code to cause the apparatus to further normalize the head word and variants of the head word to provide a canonical name for the head word and variants of the head word, and in a display of multiword terms in the unified group of multiword terms, represent any of the head word and variants of the head word that differ from the canonical name with the canonical name.

8. The apparatus of claim 6, wherein the apparatus being caused to unify the multiword terms further includes being caused to at least:
  unify modifiers in the unified group of multiword terms, including for a modifier of the modifiers in a multiword term of the unified group, the apparatus being caused to use the unsupervised machine learning algorithm and the supervised machine learning algorithm to identify others of the modifiers in others of the unified group that are variants of the modifier.

9. The apparatus of claim 8, wherein the processing circuitry is configured to execute further computer-readable program code to cause the apparatus to further normalize the modifier and variants of the modifier to provide a canonical name for the modifier and variants of the modifier, and in a display of multiword terms in the unified group of multiword terms, represent any of the modifier and variants of the modifier that differ from the canonical name with the canonical name.

10. A method of extracting features from electronic documents for database query processing, the method comprising:
  accessing , by processing circuitry, a memory storing a collection of terms of interest from a database composed of a plurality of electronic documents including free-form text;
  unifying, by the processing circuitry, terms of interest in the collection of terms of interest to identify variants of the terms of interest, including for a term of interest:
    using an unsupervised machine learning algorithm to determine semantic similarity between the term of interest and other terms in the database, and identify candidate variants of the term of interest based thereon;
    extracting linguistic features and contextual features of the term of interest and the candidate variants of the term of interest, at least the contextual features being extracted using the unsupervised machine learning algorithm; and
    using a supervised machine learning algorithm with the linguistic features and contextual features to identify variants of the term of interest from the candidate variants of the term of interest; and
  executing, by the processing circuitry, a database query for features of the plurality of electronic documents from the database using the collection of terms of interest with arrays in which the terms of interest and variants of the terms of interest are collected, for data analytics performed thereon.

11. The method of claim 10, wherein before unifying the terms of interest, the method further comprises:

defining a training set for the supervised machine learning algorithm, the training set including pairs of a term and respective other terms, and predictions of the respective other terms being variants of the term, the predictions including predictions of at least some of the other terms being variants of the term, and at least some of the other terms not being variants of the term;

extracting linguistic features and contextual features of the term and the respective other terms, at least the contextual features being extracted using the unsupervised machine learning algorithm; and using the training set and the linguistic features and contextual features to train the supervised machine learning algorithm.

12. The method of claim 10, wherein after unifying the terms of interest, the method further comprises:

normalizing, by the processing circuitry, the terms of interest to provide canonical names for the terms of interest and variants of the terms of interest, the arrays in which the terms of interest and variants of the terms of interest are collected being identifiable by respective ones of the canonical names.

13. The method of claim 10, wherein the collection of terms of interest includes multiword terms.

14. The method of claim 13, wherein unifying the terms of interest includes unifying the multiword terms that are equal in number of words and according to head words in the multiword terms.

15. The method of claim 13, wherein unifying the multiword terms includes:

identifying a group of the multiword terms that are equal in number of words; and unifying head words in the group of the multiword terms, including for a head word of the head words, using the unsupervised machine learning algorithm and the supervised machine learning algorithm to identify others of the head words that are variants of the head word, those of the group of the multiword terms that have the head word and variants of the head word constituting a unified group of multiword terms.

16. The method of claim 15 further comprising normalizing, by the processing circuitry, the head word and variants of the head word to provide a canonical name for the head word and variants of the head word, and in a display of multiword terms in the unified group of multiword terms, represent any of the head word and variants of the head word that differ from the canonical name with the canonical name.

17. The method of claim 15, wherein unifying the multiword terms further includes:

unifying modifiers in the unified group of multiword terms, including for a modifier of the modifiers in a multiword term of the unified group, using the unsupervised machine learning algorithm and the supervised machine learning algorithm to identify others of the modifiers in others of the unified group that are variants of the modifier.

18. The method of claim 17 further comprising normalizing, by the processing circuitry, the modifier and variants of the modifier to provide a canonical name for the modifier and variants of the modifier, and in a display of multiword terms in the unified group of multiword terms, represent any of the modifier and variants of the modifier that differ from the canonical name with the canonical name.

19. A non-transitory computer-readable storage medium for extracting features from electronic documents for database query processing, the computer-readable storage medium having computer-readable program code stored therein that in response to execution by processing circuitry, causes an apparatus to at least:

access a memory storing a collection of terms of interest from a database composed of a plurality of electronic documents including free-form text;

unify terms of interest in the collection of terms of interest to identify variants of the terms of interest, including for a term of interest, the apparatus being caused to at least:

use an unsupervised machine learning algorithm to determine semantic similarity between the term of interest and other terms in the database, and identify candidate variants of the term of interest based thereon;

extract linguistic features and contextual features of the term of interest and the candidate variants of the term of interest, at least the contextual features being extracted using the unsupervised machine learning algorithm; and use a supervised machine learning algorithm with the linguistic features and contextual features to identify variants of the term of interest from the candidate variants of the term of interest; and execute a database query for features of the plurality of electronic documents from the database using the collection of terms of interest with arrays in which the terms of interest and variants of the terms of interest are collected, for data analytics performed thereon.

20. The non-transitory computer-readable storage medium of claim 19 having further computer-readable program code stored therein that in response to execution by the processing circuitry, and before the apparatus is caused to unify the terms of interest, causes the apparatus to further:

define a training set for the supervised machine learning algorithm, the training set including pairs of a term and respective other terms, and predictions of the respective other terms being variants of the term, the predictions including predictions of at least some of the other terms being variants of the term, and at least some of the other terms not being variants of the term;

extract linguistic features and contextual features of the term and the respective other terms, at least the contextual features being extracted using the unsupervised machine learning algorithm; and use the training set and the linguistic features and contextual features to train the supervised machine learning algorithm.

21. The non-transitory computer-readable storage medium of claim 19 having further computer-readable program code stored therein that in response to execution by the processing circuitry, and after the apparatus is caused to unify the terms of interest, causes the apparatus to further:

normalize the terms of interest to provide canonical names for the terms of interest and variants of the terms of interest, the arrays in which the terms of interest and variants of the terms of interest are collected being identifiable by respective ones of the canonical names.

22. The non-transitory computer-readable storage medium of claim 19, wherein the collection of terms of interest includes multiword terms.

23. The non-transitory computer-readable storage medium of claim 22, wherein the apparatus being caused to unify the terms of interest includes being caused to unify the multiword terms that are equal in number of words and according to head words in the multiword terms.

24. The non-transitory computer-readable storage medium of claim 22, wherein the apparatus being caused to unify the multiword terms includes being caused to at least:
identify a group of the multiword terms that are equal in number of words; and
unify head words in the group of the multiword terms, including for a head word of the head words, using the unsupervised machine learning algorithm and the supervised machine learning algorithm to identify others of the head words that are variants of the head word, those of the group of the multiword terms that have the head word and variants of the head word constituting a unified group of multiword terms.

25. The non-transitory computer-readable storage medium of claim 24 having further computer-readable program code stored therein that in response to execution by the processing circuitry, causes the apparatus to further normalize the head word and variants of the head word to provide a canonical name for the head word and variants of the head word, and in a display of multiword terms in the unified group of multiword terms, represent any of the head word and variants of the head word that differ from the canonical name with the canonical name.

26. The non-transitory computer-readable storage medium of claim 24, wherein the apparatus being caused to unify the multiword terms further includes being caused to at least:
unify modifiers in the unified group of multiword terms, including for a modifier of the modifiers in a multiword term of the unified group, the apparatus being caused to use the unsupervised machine learning algorithm and the supervised machine learning algorithm to identify others of the modifiers in others of the unified group that are variants of the modifier.

27. The non-transitory computer-readable storage medium of claim 26 having further computer-readable program code stored therein that in response to execution by the processing circuitry, causes the apparatus to further normalize the modifier and variants of the modifier to provide a canonical name for the modifier and variants of the modifier, and in a display of multiword terms in the unified group of multiword terms, represent any of the modifier and variants of the modifier that differ from the canonical name with the canonical name.

28. The apparatus of claim 1, wherein the apparatus is caused to extract the linguistic features including string similarities between text strings that are the term of interest and the candidate variants of the term of interest.

29. The apparatus of claim 1, wherein the apparatus is caused to use the supervised machine learning algorithm with the linguistic features and contextual features to identify the variants of the term of interest including any abbreviations, acronyms and misspellings of the term of interest.

* * * * *